(12) United States Patent
Franz et al.

(10) Patent No.: US 7,653,000 B2
(45) Date of Patent: Jan. 26, 2010

(54) METHOD AND DEVICE FOR PROVISION AND EFFICIENT UTILIZATION OF RESOURCES FOR GENERATING AND OUTPUTTING INFORMATION IN PACKET-ORIENTED NETWORKS

(75) Inventors: Mathias Franz, Berlin (DE); Detlev Freund, Berlin (DE); Norbert Löbig, Darmstadt (DE); Johannes Schöpf, Fürstenfeldbruck (DE)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 10/550,221

(22) PCT Filed: Feb. 19, 2004

(86) PCT No.: PCT/EP2004/001621

§ 371 (c)(1),
(2), (4) Date: Sep. 20, 2005

(87) PCT Pub. No.: WO2004/084518

PCT Pub. Date: Sep. 30, 2004

(65) Prior Publication Data

US 2006/0187910 A1 Aug. 24, 2006

(30) Foreign Application Priority Data

Mar. 21, 2003 (DE) ................. 103 12 739

(51) Int. Cl.
*H04L 12/66* (2006.01)
(52) U.S. Cl. ..................... 370/252; 370/356
(58) Field of Classification Search ............. 370/356, 370/296, 401, 466–467, 241, 252, 254, 477, 370/395.1; 375/377; 379/88.13; 714/752
See application file for complete search history.

(56) References Cited

U.S. PATENT DOCUMENTS 5,815,502 A * 9/1998 Saito et al. ................. 370/468
6,557,136 B1 * 4/2003 Friedmann .................. 714/752
6,574,765 B2 * 6/2003 Sasaki et al. ................ 714/752

(Continued)

FOREIGN PATENT DOCUMENTS

DE 100 47 129 A1 4/2002

(Continued)

*Primary Examiner*—Ayaz R Sheikh
*Assistant Examiner*—Chuong T Ho

(57) ABSTRACT

According to the invention, an information output, e.g. a voice output, video information output, or a simultaneous output of video and audio information, which is to be transmitted via a packet-oriented network, is generation by means of pre-coded information output components. Said pre-coded information output components are present in a memory system and are retrieved as part of the processing of a request for the output of information by an information output system. Similarly, generation rules for the information output can be stored in the memory system and accessed by the information output system in order to generate the information output. According to one embodiment, information output components or generation rules are created in an information output configuration system and are subsequently made available in the memory system. The invention optimizes the use of resources for information-output services. The inventive distribution of functions permits the advantageous utilization of the performance of the related components for processing services of this type. The recorded announcement services capability known in TDM (time division multiplexing) networks can thus also be implemented in packet-oriented networks.

7 Claims, 2 Drawing Sheets

U.S. PATENT DOCUMENTS

| | | |
|---|---|---|
| 6,769,127 B1 * | 7/2004 | Bonomi et al. ................. 725/39 |
| 7,227,922 B2 * | 6/2007 | Klaghofer et al. ........... 375/377 |
| 2001/0005382 A1 | 6/2001 | Cave et al. |
| 2002/0009151 A1 * | 1/2002 | Gentric .................. 375/240.26 |
| 2003/0005076 A1 | 1/2003 | Koch et al. |
| 2003/0210659 A1 * | 11/2003 | Chu et al. ................... 370/320 |
| 2004/0042409 A1 * | 3/2004 | Hoffmann et al. ........... 370/252 |
| 2005/0030944 A1 * | 2/2005 | Lazarus et al. .............. 370/389 |
| 2005/0073997 A1 * | 4/2005 | Riley et al. ................. 370/352 |
| 2007/0053348 A1 * | 3/2007 | Koistinen ................... 370/352 |

FOREIGN PATENT DOCUMENTS

| | | |
|---|---|---|
| DE | 101 36 225 A1 | 2/2003 |
| DE | 102 00 855 A1 | 5/2003 |
| EP | 1 041 801 A2 | 10/2000 |
| EP | 1 156 649 A1 | 11/2001 |

\* cited by examiner

METHOD AND DEVICE FOR PROVISION AND EFFICIENT UTILIZATION OF RESOURCES FOR GENERATING AND OUTPUTTING INFORMATION IN PACKET-ORIENTED NETWORKS

CROSS REFERENCE TO RELATED APPLICATIONS

This application claims priority to the German application No. 10312739.9, filed Mar. 21, 2003 and to the International Application No. PCT/EP2004/001621, filed Feb. 19, 2004 which are incorporated by reference herein in their entirety.

FIELD OF INVENTION

The invention relates to a method and a device for generating an information output to be transmitted over a packet-oriented network.

BACKGROUND OF INVENTION

The object of the invention includes aspects of communication networks, switching technology and Internet technologies.

Certainly the most important current field of development in the field of networks is the transmission of real-time traffic, e.g. of voice and video information, over packet-oriented networks and the provision of the known services or service features from the classical telephone networks—also referred to as PSTN (Public Switched Telephone Network) networks or TDM (Time Division Multiplexing) networks, e.g. IP (Internet Protocol) network.

One important service is the playing of recorded announcements which are played in particular situations (e.g. 'this number is unavailable', 'the telephone number has changed, the new telephone number is 722-25940', queuing announcements or missed call announcements.) In the classic case in which the payload channel of the connection is routed into the exchange these recorded announcements can be provided by devices of the exchange equipped with the corresponding functionality or can also be provided via devices external to the exchange connected via TDM/PCM technology. If however the payload data is routed outside the exchange in a packet network an external system is preferably used for this purpose. This system possesses interfaces to the packet network for the payload data consisting of recorded announcements. Further the external announcement system has a logical control interface to the exchange undertaking the control of connections routed outside the exchange in the packet network. The recorded announcement functionality of the external system is controlled by the exchange for example by means of the Media Gateway Control protocol, abbreviated to MGCP. The recorded announcement function can be in an own network element or integrated into a network element which is present for other reasons, e.g. a media gateway.

Since certain announcements are used very frequently, these are made available in a cost effective manner in TDM-based exchanges by employing broadcast functionality. Voice announcements generated are distributed via the switching matrix present in a TDM-based exchange to a plurality of subscribers. Through timed through-switching in the peripheral device even breaking into a current announcement can be suppressed, so that the subscriber has the impression that an individual announcement is being played to them from the start.

In packet-based networks a functionality which corresponds to broadcasting which reduces the costs of recorded announcement technology is not available to the same extent. The reasons for this is that multicast routing is not available from end to end under the real-time requirements of call processing execution sequences as well as the corresponding signaling standards in the packet-based networks, inadequate availability of support for this signaling in the controlling exchange—which is referred to below to distinguish it from exchanges of the classical telephony network as a packet-based exchange, very short hold times of standard announcements, problematic control of breaking in at the correct time at the start of the announcement in the end point and difficulties relating to the standard conformity to RTP/RTCP (RTP: real time protocol; RTCP: real time control protocol) in IP-based networks. The result of this is that mass recorded announcements, for reasons of simplicity and reliability, have to be operated as individual announcements. However the cost effectiveness known from TDM-IP-based networks still has to be achieved.

A further problem lies in the need to play what are known as individual announcements in which a part of the announcement is determined dynamically. (Examples of this are announcing a changed telephone number or the speaking clock.) These types of recorded announcements consist of a sequence of speech fragments which are played as a concatenated sequence in accordance with certain predefined rules and depending on the individual content and the national language required.

To optimize the transmission bandwidth a series of very different encoding methods (e.g. G.711, G.726, G.728, G.729/GA, G723.1 and G.723) are further supported for the language in packet based networks. The hardware/software devices and functions supporting these encoding methods are referred to in technical literature as codecs (coder/decoder). Depending on the capabilities of the endpoints of a connection the codec to be used or the encoding method to be used is selected according to priority standpoints within the context of the connection setup (codec negotiation is referred to in this context). If a recorded announcement machine is the endpoint of a connection it should where possible support all the encoding methods preferred by the endpoints or terminals and thereby be able to provide its announcements in all codings required by or preferred by the end points in parallel and for individual connections.

SUMMARY OF INVENTION

An object, of the invention is the efficient provision of automatic recorded announcements in packet-based networks.

The object is achieved by the claims.

In accordance with the invention precoded information output components—also referred to below as information fragments—are provided in a memory system or memory module. The term information output component or information fragment is intended in this case to include audio and video information. Audio information in this case is not restricted to speech in the narrower sense. Information output components can also encode any sounds, tones or music sequences for example. Information fragments can for example be created from sound recordings or video sequences or via speech synthesis from texts. An information output can in such cases include audio information only, video information only or both. The coding methods mentioned below can involve coding methods for audio information as well as coding methods for video information.

The memory system provides a storage function or a content function for information output. An information output system or recorded announcement system can access the coded information fragments held in the memory system to form information outputs. The information output system or information output module provides a voice function or a video output function with the aid of which voice or video information can be furnished for transmission over a packet-based network. In accordance with the invention there is a functional separation between the storage of precoded information output components and the composition and output of information outputs in the information output system. Modules or systems associated with the two functions, the memory system and the information output system, can be spatially separated or implemented on common hardware. For communication between the two systems or for transmission of precoded information fragments a standardized interface, for example HTTP-based (http: hypertext transfer protocol) is used. In accordance with the invention, for an information output, the information output system accesses information output components held in the memory system. When a request for an information output is signaled to the information output system—usually by a packet-based exchange or through a Call Control Server—the information output system is notified of a preferred method of coding to be used for the information output. The priority list of the coding methods supported has been exchanged for example as part of a codec negotiation between the terminal of the subscriber or a network access device, which provides functions for payload data adaptation for transmission of payload data via the packet-oriented network and the packet-based network exchange and forwarded by the packet-based exchange to the information output system. The basis for such a codec negotiation for a connection are the coding methods supported by the endpoints in the packet-based network. After the request for an information output is received, within the framework of which the preferred coding method to be used is notified, the information output system requests from the memory system with the designated coding method precoded information output components. This is an arrangement in which the codec negotiation is undertaken not between two terminals on the packet-oriented network, but between a terminal or an endpoint on the packet-based network and the voice output system under the control of the packet-based exchange or of a Call Control Server. The information output components requested from the memory system are transmitted to the information output system and used to form the information output. They can then be stored in the information output system for further use.

The use of precoded fragments represents an efficiency gain compared to methods in which coding is not undertaken until the information output request is being processed. The computing or CPU load of the information output system is reduced, which increases the number of information output requests which can be processed in parallel. The functional separation of information output and storage of the precoded fragments thus allows an efficient utilization of resources and creates the conditions for good scalability. This is because access is possible from a plurality of information output systems or information output modules to the information fragments supplied by the memory system. Scaling up to a larger capacity can be undertaken by using a plurality of the system components or system modules, i.e. through provision of a plurality of information output systems or memory systems.

In accordance with an advantageous development the information output system additionally provides creation rules or creation specifications for information outputs. These creation rules are referenced by the information output systems in accordance with the relevant service requested and retrieved from the memory system. The creation rules are needed to assemble the requested information output from information fragments. Creation rules or creation specification include code elements written with XML (Extended Markup Language) for example. Creation specifications transmitted to the information output system can be stored for use with further similar service requests.

Stored fragments or creation specifications can be provided with a lifetime or with a timer. If within this lifetime a fragment or a creation specification is not used for an information output, it is deleted if for example there is a desire to optimize the storage space requirement in the information output system. Likewise fragments and/or creation specifications can be deleted unconditionally when a maximum lifetime is reached, e.g. to keep the outputs up to date.

It is sensible to keep as many information output components used for information output as possible in precoded form in order in this way to avoid expensive coding during the processing of the request. The precoded fragments can also be assembled into an information output during the processing of a request with information fragments generated for an information output. It is conceivable for example for individualized information output components, such as telephone numbers or other information requested during the request. to be created during processing. These individualized information output components are generated for example by means of text-to-speech conversion, with the generated information output component being coded with the coding method used for information output. In accordance with the invention, the generation of information output components during the processing of requests is however at least reduced to a minimum, preferably avoided altogether. By minimizing the effort as regards coding during the processing of requests for an information output the use of the available computing power is optimized.

The information output components and the creation specifications can be generated in the memory system. In a preferred solution however the information output components or the creation specifications are generated in a separate module which is referred to here as the information output design system and for example can be accommodated in the network operator's network management system or possibly is even only present at the manufacturer/network contractor. Preferably an information output design system provides information output components or creation specifications for a plurality of memory systems, i.e. a smaller number of these equipment elements (possibly only one) is present in the network. In this way the functions of the information output design system, e.g. the licenses for voice or video coding are used efficiently. Precoded information fragments or creation specifications generated in the information output system are then transferred to the memory system or to a plurality of memory systems, so that they are available for use in information outputs. The information output design system or information output design module has the function of generating components according to the requirements of the network operator and their customers, meaning that it is a tooling function in respect of the information output system. A system with a three-layer system architecture is then provided which includes at least one information output system, at least one memory system and at least one information output design system. Through a centralized generation of precoded information fragments and the transfer of the fragments or of any creation rules generated to a memory system or to a plurality of memory systems and the provision there for access by information output systems, the processing effort for providing information fragments or creation rules for information output requirements is minimized, so that the number of requests that can be processed in parallel is at its optimum. The transfer of information fragments or creation specifications from the information output design system to the at least one memory system can for example be undertaken with the aid of FTP (File Transfer Protocol).

The information output system is preferably a general purpose machine with commercial hardware and open operating system interface, as is used for example in soft switch scenarios. As well as the information output functionality, further functions can then be provided on this hardware. For example the information output system and the memory system can be implemented on the same hardware element implementing, e.g. for very small applications and field trials of the network operator before widespread introduction of new IP-based technology.

The object of the invention thus includes a device which comprises an information output system which is provided with means for executing the method in accordance with the invention, i.e. with means for calling up precoded information fragments or creation specifications. Likewise a device with a memory system is included, with the memory system having means for the storage of precoded information fragments or creation specifications as well as means for transmission of precoded information fragments or creation specifications requested within the context of the processing of an information output. Finally a device with an information output design system with means for generating precoded information fragments or creation specifications as well as for transmission of these precoded information fragments or creation specifications to memory systems is also part of the inventive object.

BRIEF DESCRIPTION OF THE DRAWINGS

The inventive object is explained in greater detail below within the context of an exemplary embodiment with reference to Figures. The Figures show.

DETAILED DESCRIPTION OF INVENTION

Figure 1:
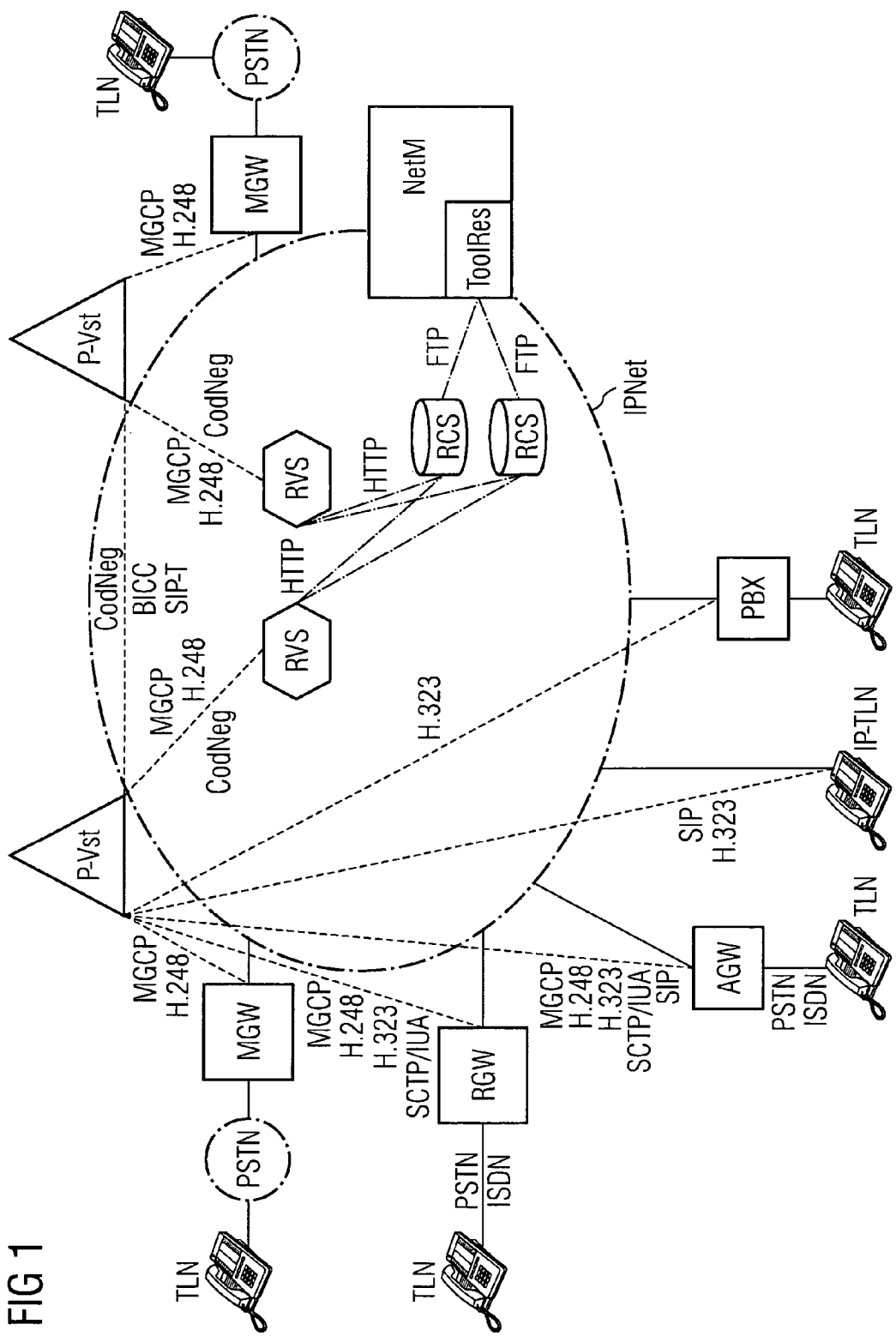
FIG. 1 a system with device elements for an information output in accordance with the invention.

A packet-based network IPNet is shown in the center of FIG. 1. Different access options by subscribers or terminals TLN with the aid of access devices are shown. Analog (PSTN) or ISDN subscribers are for example connected via a media gateway MGW (control protocol e.g. MGCP or H.248) directly via a residential gateway RGW (control protocol e.g. MGCP, H.248, H.323 or SCTP/IUA) or an access gateway AGW (control protocol e.g. MGCP, H.248, H.323, SCTP/IUA or SIP). Not shown in the Figure are SS#7 (Signaling system No. 7) signaling messages transferred from the PSTN network or the ISDN network to the packet-based exchanges. Other options are subscribers connected via an IP telephone IP-TLN who communicate with the aid of SIP (Session Initiation Protocol) or the H.323 protocol with the packet-based exchange acting as the SIP proxy or H.323 gatekeeper and access the packet-oriented network IPNet, and also subscribers who are connected via a PBX (Private Branch Exchange) with packet-based signaling (e.g. SIP, H.323) to the packet-oriented network IPNet. The access devices Media Gateway MGW, Residential Gateway RGW, and Access Gateway AGW, exactly like the Private Branch Exchange PBX are controlled or operated by a packet-oriented exchange P-Vst. Protocols used here are for example the MGCP protocol, the H.248 protocol, the H.323 protocol, the SCTP/IUA protocol (SCTP: stream control transmission protocol; used for the transparent transport of ISDN signaling) or the SIP protocol (SIP: session initiation protocol). The packet-oriented exchange P-Vst communicates with other packet-oriented exchanges P-Vst with the aid of the BICC (BICC: Bearer Independent Call Control) protocol or of the SIP-T protocol. For the definition of a coding method for voice output which becomes necessary because of a new connection request, a priority list of the supported coding methods is transmitted from the subscriber TLN or upstream gateways MGW, RGW or AGW or private branch exchange PBX to the packet-oriented exchange P-Vst controlling the information output devices, which leads to the determination or the definition of the coding method to be used. This is referred to as codec negotiation CodNeg. In this case said priority list can also only include just a single coding method. Furthermore— controlled by a packet-oriented exchange P-Vst with the aid of the MGCP protocol or of the H.248 protocol—two RVS (Resource Voice System) are presented. These two information output systems each have access to two memory systems RCS (Resource Content System) with the aid of the HTTP protocol. The memory systems RCS are fed by an information output design system ToolRes (Tooling Resources) with the aid of FTP (File Transfer Protocol) with information fragments and creation rules. The information output design system is located at the network management system NetM. The memory system RCS and the information output system RVS are duplicated at separate locations for security reasons for example.

Figure 2:
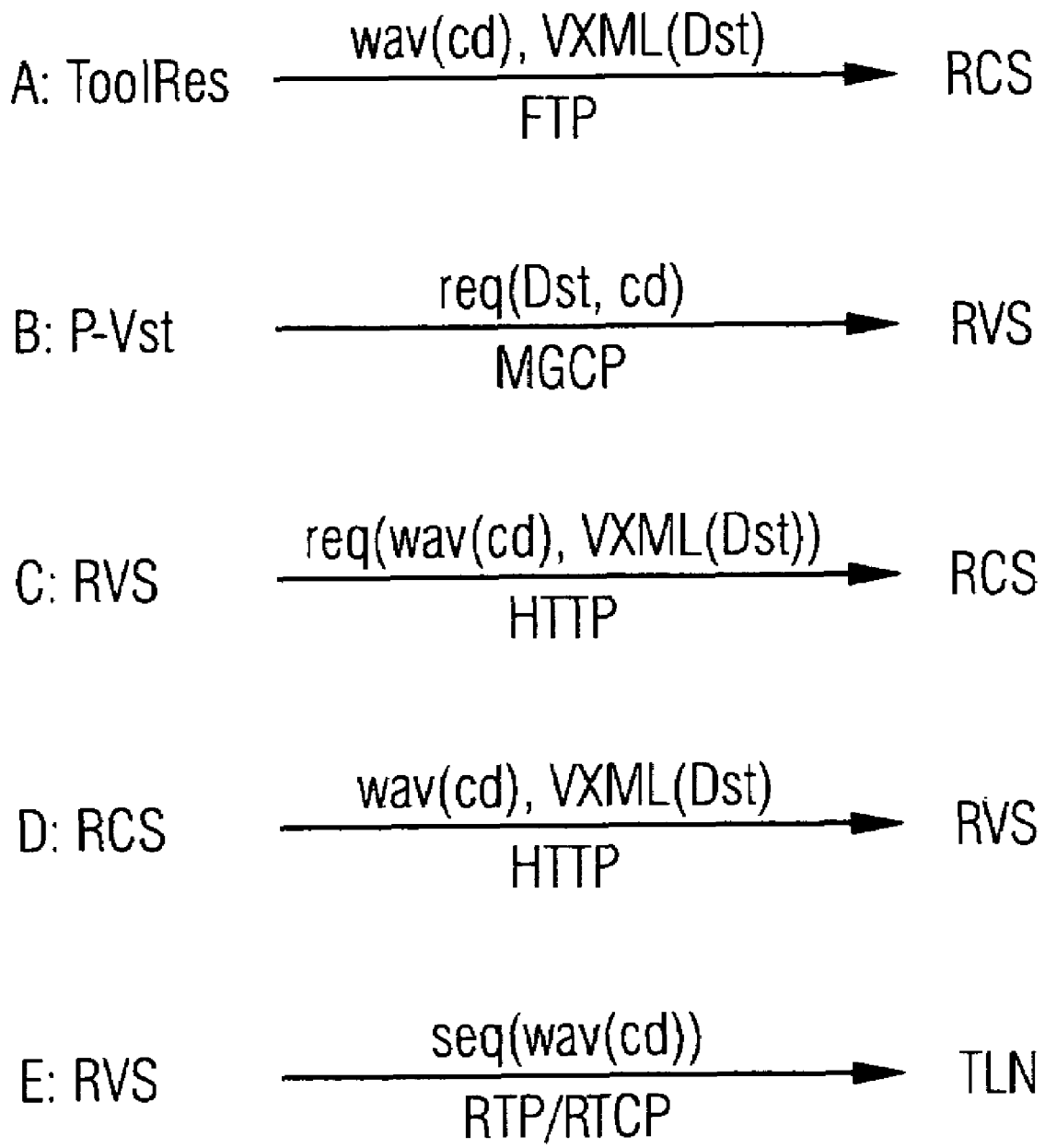
FIG. 2 a sequence of steps for an information output in accordance with the invention.

FIG. 2 shows more details of the execution sequences for a voice output as a reaction to a request for a voice output. As a first step (step A) voice fragments wav(cd) and creation rules VXML(DST) are generated by the voice output design system ToolRes and transferred to the memory system RCS. The transfer of these files is effected with the aid of the FTP protocol. This transfer is generally undertaken at system commissioning as well as completely or partly in the case of updates of voice outputs of creation rules. The voice fragments are coded in accordance with a coding method cd. It is sensible to keep voice fragments in different codings in order to also be able to offer services for terminals which only support specific coding methods. Preferably all possible coding methods supported in the network are used and the voice fragments generated in corresponding coding created and loaded into the memory system. The transferred creation specifications VXML(Dst) consist for example of files written in the programming language VoiceXML (abbreviated in the Figure to VXML), with creation specifications VXML (Dst) being provided for numerous supported services Dst and depending on further specified parameters. This means that the creation rules are referenced in accordance with the associated service Dst and the further dynamic parameters. The voice fragments wav(cd) coded in the memory system RSC (the abbreviation wav was selected with regard to what are known as wave files which have the extension wav and contain sampled values of speech or tones) are then available for the formation of voice outputs. With a request for a voice output, for example an announcement of a telephone number or information about the fact that a subscriber is unavailable, the packet-oriented exchange P-Vst, which controls the voice output system RVS is informed about the corresponding requirements or itself recognizes the necessity of voice output from the call processing execution sequences. The packet-oriented exchange P-Vst, with the aid of the MGCP protocol or another suitable packet-based network protocol (e.g. also H.248/MEGACO) instructs the voice output system to undertake the desired voice output. This is done with the aid of a request message req(Dst,cd), which contains as parameters the desired services Dst, i.e. the announcement to be played, and the list of the preferred coding methods to be used cd, which is required within the framework of codec negotiation (step B). Further parameters, which determine type and content of the voice output, can be transferred with the aid of this message. Requests for announcements and connection setup of the useful data stream including request for the at least one coding method are normally transmitted in separate MGCP messages. The voice output system identifies on the basis of the transferred parameters the elements needed for voice output which it must request from the memory system for voice output. It is possible that voice output components or creation specifications are already present in the voice output system RVS, e.g. because they have been used for an earlier service and within the course of the earlier service have already been requested from the memory system RCS. In the present case the voice output system requests with a message req(wav(cd),VXML(Dst)) (req stands for request) voice fragments wav(cd) precoded with the coding method cd and/or a creation specification VXML(Dst) from the memory system RCS with the aid of the HTTP protocol (step C). The creation specification VXML(Dst) can depend on further parameters transferred by means of the request message req(Dst,cd). The requested voice fragments wav(cd) or the requested creation specification VXML(Dst) are then transmitted from the memory system RCS to the voice output system RVS again with the aid of the HTTP protocol (step D). Step C and step D can be executed a number of times for the processing of the desired services Dst. The voice output system RVS then forms the corresponding service Dst with the aid of the creation specification VXML(Dst) and in some cases further parameters of the requested voice output sequence seq(wav (cd)) which comprise a sequence of concatenated or assembled voice fragments wav(CD), which are coded with the coding method determined during codec negotiation, (step E). If it is recognized from the creation specification that, in addition to the locally stored voice fragments, further voice fragments of specific coding wav(cd) are necessary which, as a result of their retention period expiring are no longer available or are not needed, these are requested in the same way from a memory system. With standard announcements however both the creation rules and also the voice fragments needed are generally available locally in the RVS after a little time in each coding supported, so that requesting them from a memory system can be dispensed with entirely, provided the rare case of expiry of the validity of the formation rule or of a voice fragment of the desired encoding does not occur. This voice output seq(wav(cd)) is then transmitted by the voice output system RVS as payload data over the packet-oriented network to the terminal or subscriber TLN. The transmission of the voice information over the packet-oriented network is undertaken for example by means of the RTP, including the RTCP protocol.

The invention claimed is:

1. A method for generating an announcement in the form of an information output for a person engaged in real-time traffic communication to—be transmitted over a packet-oriented network wherein the announcement is also transmitted as a real-time traffic communication, the method comprising:

signaling a request for generation of the announcement, for transmission as a real-time traffic communication, an information output to an information output system;

generating a series of fragments which can be concatenated into an announcement;

storing the fragments in a memory, system;

generating a series of creation rules in accord with which the announcement is formed from the fragments, wherein the creation rules are referred by the information output system in accordance with a relevant service request and retrieved from the memory;

storing the creation rules in the memory system; transmitting information about at least one coding method which can be used for encoding some of the fragments for the process of creating and transmitting the announcement, wherein the encoding is suitable both for output to the information output system and transmission over the packet-oriented network;

acquiring from the memory system a plurality of the fragments as information output components in a coding suitable for information output over the packet switching network;

determining a concatenation of a plurality of the fragments to form the announcement;

transmitting the plurality of fragments to the information output system and then through the packet switching network in the suitable coding for receipt of the fragments at a destination so that a user can receive the announcement in accord with the concatenation, wherein the memory system transmits creation rules to the information output system for determination of the concatenation, the fragments information output component and the creation rules are stored in the information output system, and the announcement information output is generated upon an information output request based on the creation rules.

2. The method in accordance with claim 1, wherein fragments includes an information element chosen from the group consisting of audio information, voice information and video information.

3. The method in accordance with claim 1, wherein the information output is requested using a standardized signaling protocol.

4. The method in accordance with claim 3, wherein subscribers in the network communicate with a signaling protocol which is MGCP or H.248/MEGACO.

5. The method in accordance with claim 1, wherein the creation rules are stored in the information output system for further use.

6. The method in accordance with claim 1, wherein the fragments are stored in the information output system for a limited period of time, the period of time determined from at least one characteristic of the information output component to be stored.

7. The method in accordance with claim 1, wherein one of the fragments is generated while the request for the information output is processed by the information output system.

* * * * *

UNITED STATES PATENT AND TRADEMARK OFFICE
CERTIFICATE OF CORRECTION

PATENT NO.       : 7,653,000 B2                                               Page 1 of 1
APPLICATION NO.  : 10/550221
DATED            : January 26, 2010
INVENTOR(S)      : Franz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 888 days.

Signed and Sealed this

Twenty-third Day of November, 2010

David J. Kappos
*Director of the United States Patent and Trademark Office*